(12) United States Patent
Stringham

(10) Patent No.: US 8,793,222 B1
(45) Date of Patent: Jul. 29, 2014

(54) SYSTEMS AND METHODS FOR INDEXING BACKUP CONTENT

(75) Inventor: Russell Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 518 days.

(21) Appl. No.: 12/614,012

(22) Filed: Nov. 6, 2009

(51) Int. Cl.
*G06F 17/30* (2006.01)
*G06F 15/16* (2006.01)

(52) U.S. Cl.
USPC .......................................... 707/673; 707/649

(58) Field of Classification Search
USPC ................................................. 707/649, 673
See application file for complete search history.

(56) References Cited

U.S. PATENT DOCUMENTS

| 2006/0129618 A1* | 6/2006 | Maier ........................... 707/204 |
| 2007/0043715 A1* | 2/2007 | Kaushik et al. .................... 707/4 |
| 2007/0043790 A1* | 2/2007 | Kryger .......................... 707/204 |
| 2008/0016126 A1* | 1/2008 | Kottomtharayil et al. .... 707/201 |

* cited by examiner

*Primary Examiner* — Alex Gofman
(74) *Attorney, Agent, or Firm* — ALG Intellectual Property, LLC

(57) ABSTRACT

A computer-implemented method for indexing backup content may include identifying a backup of live data. The computer-implemented method may also include identifying a content index that indexes at least a part of the live data. The computer-implemented method may further include identifying a set of files in the backup that correspond to a set of files indexed by the content index. The computer-implemented method may additionally include indexing the content of the set of files in the backup based on the index information of the set of files indexed by the content index. Various other methods, systems, and computer-readable media are also disclosed.

20 Claims, 7 Drawing Sheets

200

SYSTEMS AND METHODS FOR INDEXING BACKUP CONTENT

BACKGROUND

Organizations increasingly back up large quantities of data for a variety of purposes, including disaster recovery, safeguarding against accidental data corruption or deletion, and meeting electronic discovery ("e-discovery") requirements.

However, the increasing volume of backed up data may make locating certain data within a backup more difficult. An inability to efficiently find certain data or data with certain characteristics may undermine some of the goals behind backing up data. For example, if an organization wants to recover all files that reference a certain subject matter, it may be impractical to look through every file in a backup. Likewise, if an organization must retrieve files for e-discovery, manually inspecting each file in a backup may be inefficient or even impracticable.

In order to facilitate the efficient location of files in a backup, an organization may attempt to index the content of the files in the backup. Unfortunately, indexing files during a backup operation may substantially slow the backup operation, and indexing files after a backup operation may be a resource intensive operation (e.g., if the backup files are stored on tape) or impractical (e.g., if the backup files are stored offsite and are not accessible by a network). Accordingly, the instant disclosure identifies a need for efficiently and effectively indexing backup content.

SUMMARY

As will be described in greater detail below, the instant disclosure generally relates to systems and methods for indexing backup content. Embodiments of the instant disclosure may efficiently index backup content by using an existing content index that covers live data that corresponds to the backup data. In one example, various systems described herein may accomplish this task by: 1) identifying a backup of live data, 2) identifying a content index that indexes at least a part of the live data, 3) identifying a set of files in the backup that correspond to a set of files indexed by the content index, and 4) indexing the content of the set of files in the backup based on index information of the set of files indexed by the content index.

The method for indexing backup content may be performed in a variety of contexts. For example, the backup of live data may be created from a snapshot. In such embodiments, the snapshot may include the content index. In another example, the backup of live data may be an incremental backup.

In some embodiments, the method may, as part of identifying the content index, update the content index to include one or more files covered by the backup of the live data.

Identifying the backup files that correspond to the indexed files may include 1) identifying metadata for at least one file in the backup, 2) comparing the metadata with the metadata in the content index, and 3) determining that the file in the backup is equivalent to a file in the content index based on the metadata. In certain examples, the metadata may include a file size, a creation time, a last modification time, and/or a fingerprint.

Indexing the content of the backup files may occur in a variety of ways. For example, the backup content may be indexed by adding the index information to a backup content index. As another example, the backup content may be indexed by copying the content index and modifying the copy of the content index to refer to the backup locations of the backup files. In another example, the backup content may be indexed by adding references to the backup files into the content index. In such embodiments, adding the references to the backup files to the content index may include creating duplicate entries in the content index for the backup files. Additionally or alternatively, indexing the content of the backup files may include adding the locations of the backup files to corresponding entries in the content index.

According to certain embodiments, various systems described herein may also stop the content index from updating until after indexing the content of the set of files in the backup.

In some examples, a system for indexing backup content may include an identification module and an indexing module. The identification module may be programmed to identify a backup of live data and identify a content index that indexes at least a part of the live data. The identification module may also be programmed to identify a set of files in the backup that correspond to a set of files indexed by the content index. The indexing module may be programmed to index the content of the set of files in the backup based on index information of the set of files indexed by the content index.

According to some examples, the identification module may be programmed to identify the set of files in the backup that correspond to the set of files indexed by the content index by identifying metadata for at least one file in the backup, comparing the metadata with the metadata in the content index, and determining that the file in the backup is equivalent to a file in the content index based on the metadata.

The indexing module may be programmed to index the content of the set of files in the backup in a variety of ways. For example, the indexing module may be programmed to index the content of the set of files in the backup by adding references to each file in the set of files in the backup to the content index. In some examples, the indexing module may be programmed to add the references to the files in the set of files in the backup to the content index by creating, for each file in the set of files indexed by the content index, a duplicate entry in the content index for a corresponding file in the set of files in the backup. According to certain embodiments, the indexing module may be programmed to add the references to the files in the set of files in the backup to the content index by adding to an index entry, for each file in the set of files indexed by the content index, a location of a corresponding file in the set of files in the backup. In some examples, the indexing module may be programmed to index the content of the set of files in the backup by identifying a backup content index and merging the index information from the content index of the live data into the backup content index. In additional examples, the indexing module may be programmed to index the content of the set of files in the backup by copying the content index and modifying the copy of the content index to refer to a backup location of each file in the set of files indexed by the content index.

In some examples, a computer-readable-storage medium may include one or more computer-executable instructions that, when executed by at least one processor of a computing device, cause the computing device to identify a backup of live data, identify a content index that indexes at least a part of the live data, identify a set of files in the backup that correspond to a set of files indexed by the content index, and index the content of the set of files in the backup based on index information of the set of files indexed by the content index.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
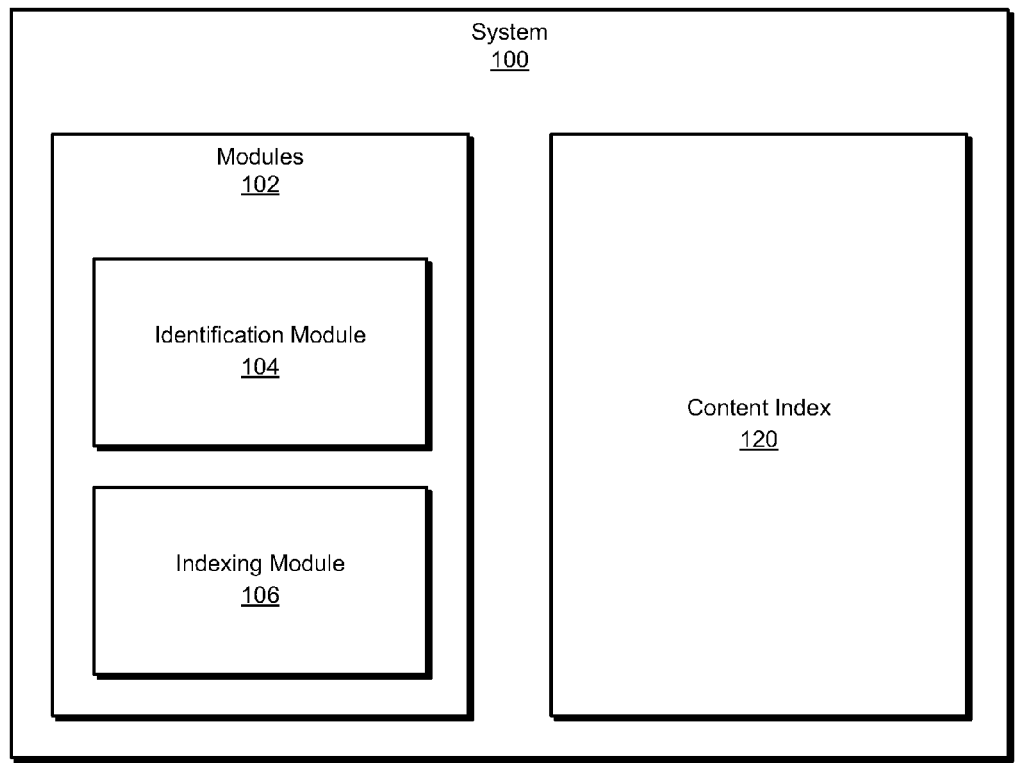
FIG. 1 is a block diagram of an exemplary system for indexing backup content.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for indexing backup content. In one example, various systems described herein may accomplish this task by: 1) identifying a backup of live data, 2) identifying a content index that indexes at least a part of the live data, 3) identifying a set of files in the backup that correspond to a set of files indexed by the content index, and 4) indexing the content of the set of files in the backup based on index information of the set of files indexed by the content index.

As will be explained below, by using information from an existing content index of live data to index content of a backup, systems and methods described herein may save computing resources by avoiding duplicative indexing work, such as content conversion (e.g., converting DOC, PDF, XLS, PPT, and other files to an HTML file or a TXT file), tokenization (e.g., parsing for meaningful words, units, regular expressions, or other patterns), stemming (e.g., grouping expressions that are likely equivalent), and/or classification (e.g., classifying index entries based on patterns in the index). Various systems and methods described herein may also allow content indexing for offsite backup content, efficient content indexing of a backup long after the backup was taken, and/or efficient content indexing of a backup at the time the backup is taken.

Figure 2:
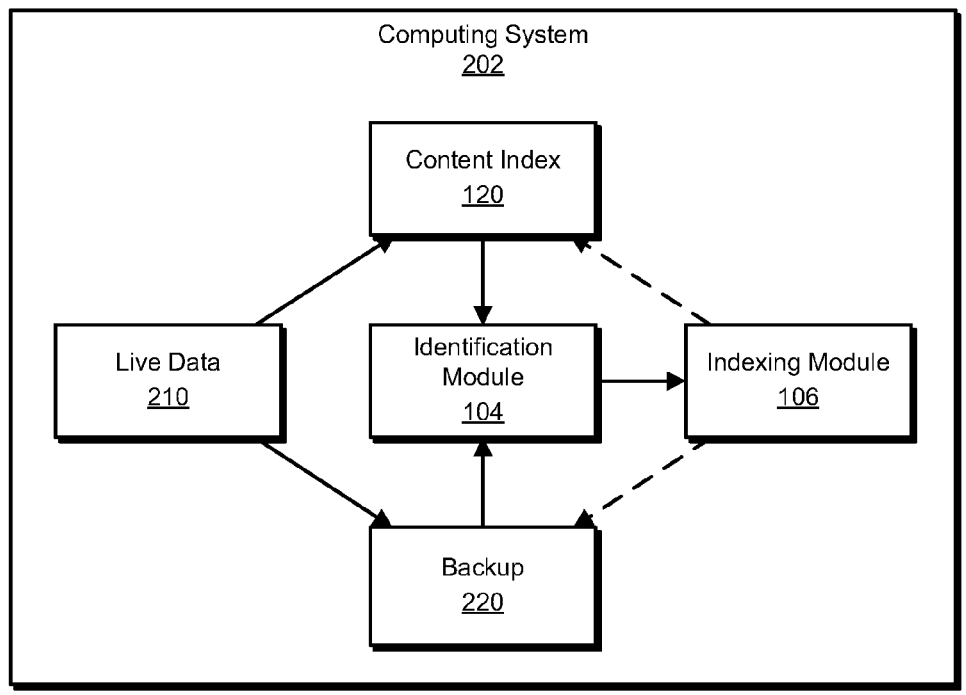
FIG. 2 is a block diagram of another exemplary system for indexing backup content.
Figure 4:
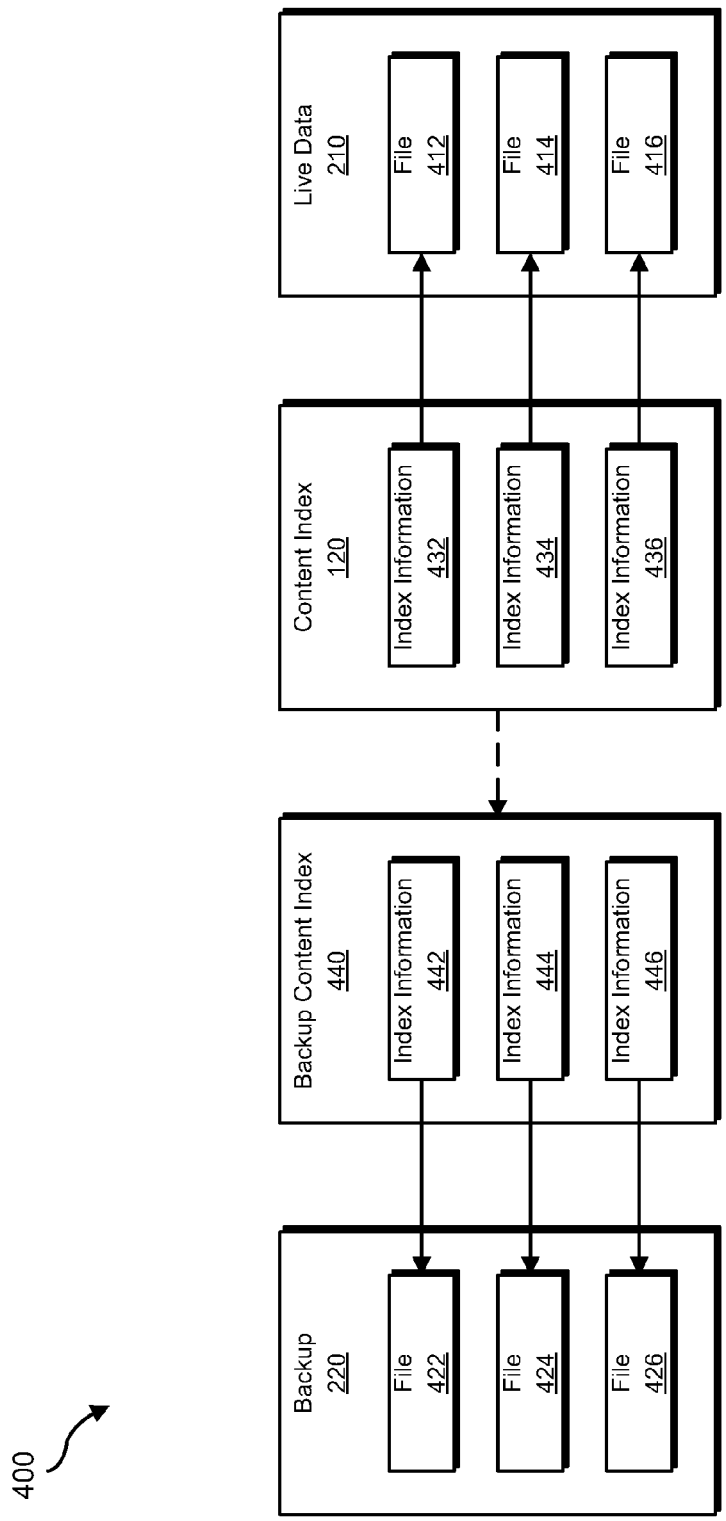
FIG. 4 is a block diagram of an exemplary system for indexing backup content.
Figure 5:
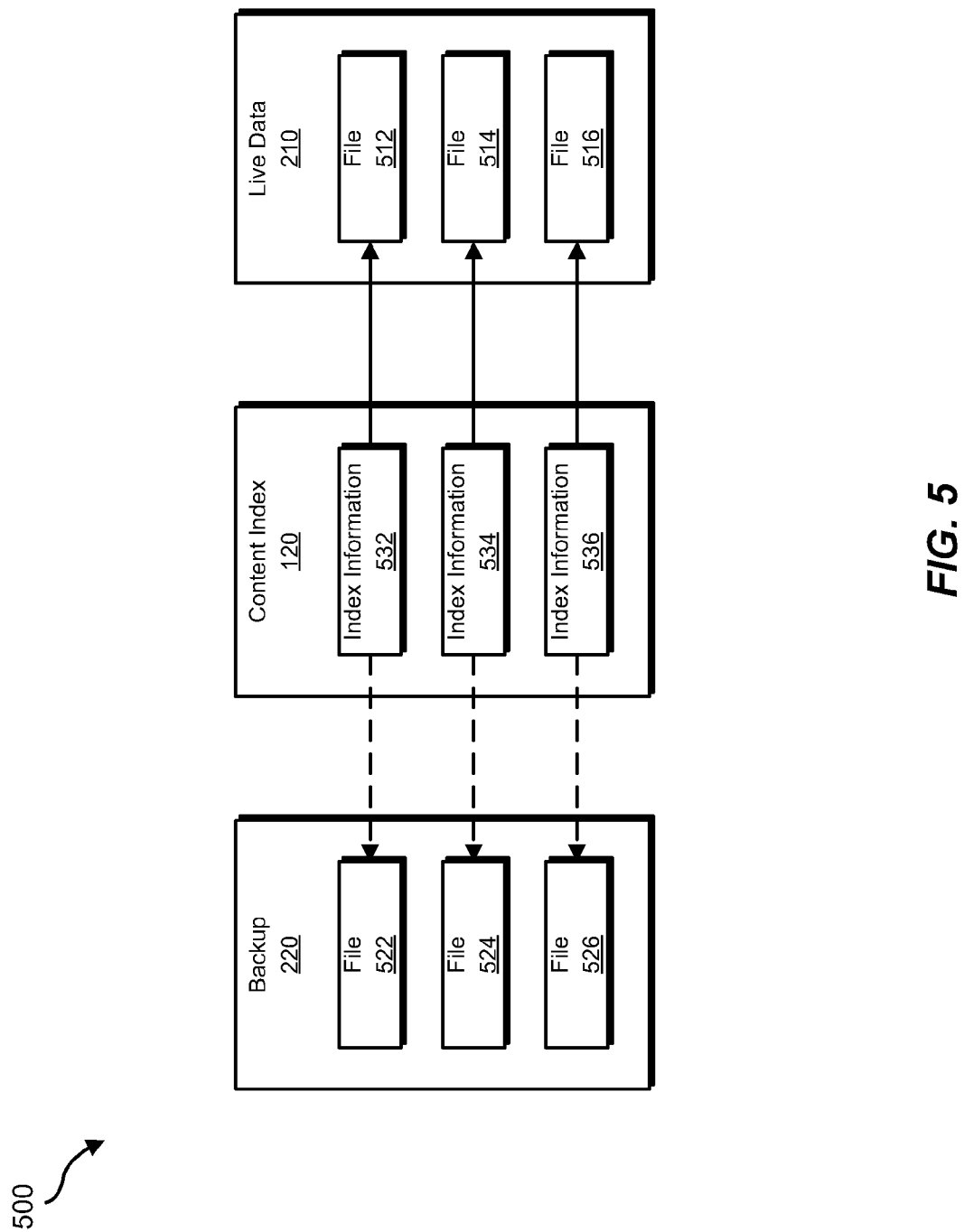
FIG. 5 is a block diagram of another exemplary system for indexing backup content.

The following will provide, with reference to FIGS. 1-2, detailed descriptions of exemplary systems for indexing backup content. Detailed descriptions of corresponding computer-implemented methods will also be provided in connection with FIG. 3. Illustrations of exemplary content indexing for backup content will also be discussed in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for indexing backup content. As illustrated in this figure, exemplary system 100 may include one or more modules 102 for performing one or more tasks. For example, and as will be explained in greater detail below, exemplary system 100 may include an identification module 104 programmed to identify a backup of live data, identify a content index that indexes at least a part of the live data, and identify a set of files in the backup that correspond to a set of files indexed by the content index.

In addition, and as will be described in greater detail below, exemplary system 100 may include an indexing module 106 programmed to index the content of the set of files in the backup based on index information of the set of files indexed by the content index. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include a content index 120. Content index 120 may represent a portion of one or more computing devices. For example, content index 120 may represent a portion of computing system 202 in FIG. 2, computing system 610 in FIG. 6, and/or portions of exemplary network architecture 700 in FIG. 7. Alternatively, content index 120 in FIG. 1 may represent one or more physically separate devices capable of being accessed by a computing device, such as computing system 610 in FIG. 6 and/or portions of exemplary network architecture 700 in FIG. 7.

Exemplary system 100 in FIG. 1 may be deployed in a variety of ways. For example, all or a portion of exemplary system 100 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

As shown in FIG. 2, system 200 may include a computing system 202. In one embodiment, and as will be described in greater detail below, computing system 202 may be programmed to index backup content, such as content of a backup 220. For example, computing system 202 may be programmed with identification module 104 and indexing module 106 from FIG. 1. In this example, and as will be described in greater detail below, identification module 104 may identify a backup of live data (e.g., identification 104 may identify backup 220 of live data 210). Identification module 104 may also identify a content index (such as content index 120) that indexes at least a part of the live data. Identification module 104 may additionally identify a set of files in the backup that correspond to a set of files indexed by the content index (e.g., identification module 104 may identify a set of files in backup 220 that correspond to a set of files indexed by content index 120).

Indexing module 106 may then index the content of the set of files in the backup based on index information of the set of files indexed by the content index (e.g., indexing module 106 may index the content of the set of files in backup 220 based on index information of the set of files indexed by content index 120).

Computing system 202 generally represents any type or form of computing device capable of reading computer-executable instructions. Examples of computing system 202 include, without limitation, laptops, desktops, servers, cellular phones, Personal Digital Assistants ("PDAs"), multimedia players, embedded systems, combinations of one or more of the same, exemplary computing system 610 in FIG. 6, or any other suitable computing device.

Backup 220 may represent a portion of one or more computing devices, such as a desktop computer, a backup storage device, and/or a backup server. For example, backup 220 may represent a portion of computing system 202 in FIG. 2, backup storage device 633 in FIG. 6, and/or server 740 in FIG. 7.

Figure 3:
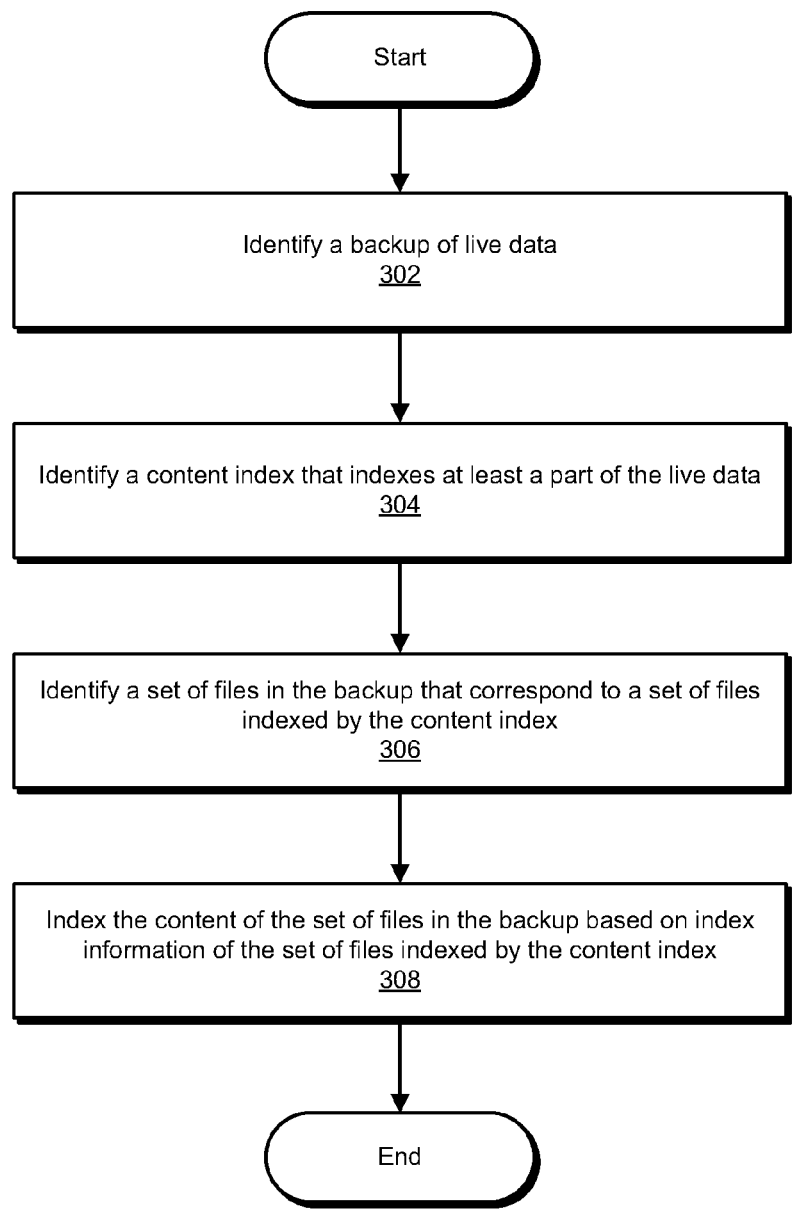
FIG. 3 is a flow diagram of an exemplary method for indexing backup content.

FIG. 3 is a flow diagram of an exemplary computer-implemented method 300 for indexing backup content. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a backup of live data. For example, at step 302 identification module 104 may, as part of computing system 202, identify a backup 220 of live data 210. As used herein, the phrase "live data" may refer to any data that may be backed up, such as data currently in use on a computing system, data that is directly accessible on a computing system, data that is stored on a primary storage device of a computing system, and/or an original or primary copy of data that a backup system has backed up, is backing up, and/or will back up. The "live data" may include data in any suitable format, including but not limited to files, database entries, media files, and/or e-mail messages. As used herein, the term "backup" may refer to any procedure to backup, archive, duplicate, compress, rearrange, and/or transfer data and/or the results of any such procedure.

Identification module 104 may identify the backup of the live data in a variety of contexts. For example, identification module 104 may identify the backup of the live data as the backup is being made. Additionally or alternatively, identification module 104 may identify the backup of the live data after it has been made.

Identification module 104 may also identify the backup of the live data in a variety of ways. For example, identification module 104 may identify the backup of the live data by receiving a message from a backup system that is performing the backup. Additionally or alternatively, identification module 104 may identify the backup of the live data by reading a log file identifying the backup. In certain examples, identification module 104 may identify the backup of the live data by receiving an administrative instruction and/or command (e.g., an administrator may decide to index the content of a certain backup previously performed).

Identification module 104 may identify a variety of types of backup at a variety of stages. For example, identification module 104 may identify an incremental backup. In another example, identification module 104 may identify an archive and/or an archiving operation. Additionally or alternatively, identification module 104 may identify a snapshot from which the backup will be created. In some examples, identification module 104 may identify the backup by creating the snapshot from which to create the backup.

In various examples, as part of creating the snapshot from which to create the backup, identification module 104 may include the content index in the snapshot. As will be described below, this may enable methods and systems described herein to index the content of the backup at a later time (e.g., during a time when the original copy of the context index may not be available and/or no longer consistent with the content of the backup). In some examples, identification module 104 may update the content index to match the versions of the files captured in the snapshot in order to guarantee that the snapshot of the content index contains all information necessary to fully and correctly index the backup.

Returning to FIG. 3, at step 304 one or more of the systems described herein may identify a content index that indexes at least a part of the live data. For example, at step 304 identification module 104 may, as part of computing system 202, identify a content index 120 that indexes at least a part of live data 210. As used herein, the phrase "content index" may refer to any file, data structure, configuration of data, and/or systemization of data that indexes units of data according to their content and/or characteristics. Exemplary systems creating, using, and/or consisting at least in part of a content index may include MICROSOFT WINDOWS SEARCH, GOOGLE DESKTOP, APPLE SPOTLIGHT, GOOGLE ENTERPRISE SEARCH, and/or VIVISIMO VELOCITY.

Identification module 104 may identify the content index in any suitable manner. For example, identification module 104 may identify the content index by reading a configuration file. Additionally or alternatively, identification module 104 may identify the content index by receiving a message from a system that created and/or uses the content index. In some examples, identification module 104 may identify the content index by searching a storage device for a file with characteristics that match a known content index format. In certain examples, identification module 104 may identify the content index by updating the content index and/or contributing to the content index.

Identification module 104 may update the content index to include files covered by the backup of the live data in order to ensure complete and adequate indexing of the backup. Since a content indexing system may run as a background process that may not necessarily index files as soon as they are created or modified, the content index may not always include complete current information about files (such as files that the content indexing system had not yet indexed or was in the process of indexing). By updating the content index up to the time of the backup, subsequent use of the content index for indexing the content of the backup may produce more complete and accurate results. In certain embodiments, identification module 104 may update the content index by forcing the content indexing system to update the content index. In some embodiments, identification module 104 may update the content index by indexing files in the backup and then providing the index information to the content index.

Returning to FIG. 3, at step 306 one or more of the systems described herein may identify a set of files in the backup that correspond to a set of files indexed by the content index. For example, at step 306 identification module 104 may, as part of computing system 202, identify a set of files in backup 220 that correspond to a set of files indexed by content index 120 (or that should be indexed by content index 120, but have not yet been indexed). As used herein, the phrase "set of files" may refer to one or more files (or other suitable units of data).

Identification module 104 may identify the set of files in the backup that correspond to the set of files indexed by the content index in any suitable manner. For example, identification module 104 may identify the set of files in the backup by identifying each file as the file is backed up. Additionally or alternatively, identification module 104 may identify the set of files by identifying metadata for each file, comparing the metadata with metadata in the content index, and determining that the file in the backup is equivalent to a file in the content index based on the metadata. The metadata may include any information about the file and/or pattern in the file suitable for identifying the file. For example, the metadata may include file size, file name, file path, file location, creation time, last modification time, last access time, and/or a fingerprint (e.g., a checksum, hash function, digital signature, etc.) of the file.

As an example of the process described above, identification module 104 may identify the size of a file in the backup (e.g., 14172 bytes) and the creation time of the file (e.g., 07:49, 30 Dec. 1980). Identification module 104 may also identify an entry in the content index with the same file size and creation time. Identification module 104 may then determine that the entry in the content index corresponds to a file that is equivalent to the file in the backup.

As mentioned earlier, some content indexing systems may not keep the content index up to date continuously. By matching files in the backup with entries in the content index based on metadata, various systems and methods described herein may accurately index files in the backup even if the content index is not current to the time of the backup. Furthermore, by matching files in the backup with entries in the content index based on the metadata, various systems and methods described herein may be able to index files that were backed up before systems and methods described herein were in place.

Returning to FIG. 3, at step 308 one or more of the systems described herein may index the content of the set of files in the backup based on index information of the set of files indexed by the content index. For example, at step 308 indexing module 106 may, as part of computing system 202, index the content of the set of files in backup 220 based on index information of the set of files indexed by content index 120. As used herein, the phrase "index information" may refer to any information in the content index, including but not limited to file metadata, tokens, index entries, classifications, etc.

Indexing module 106 may index the content of the set of files in the backup based on the index information in a variety of contexts. For example, indexing module 106 may index the content of the set of files in the backup when the content index of the live data corresponds exactly to the data in the backup (e.g., each file represented by an entry in the content index may be backed up in the same state in the backup). Such a case may arise when a content indexing system (such as GOOGLE DESKTOP) has indexed all data on a computing system and a backup system (such as BACKUP EXEC SYSTEM RECOVERY) creates a full system backup.

In the above described context, indexing module 106 may index the content of the set of files in the backup in a variety of ways. For example, indexing module 106 may copy the content index and then modify the copy of the content index to refer to a backup location of each file in the set of files indexed by the content index.

As an illustration of the scenario described above, and by way of example only, FIG. 4 shows a system 400 with a content index 120 having index information 432, 434, and 436, which may correspond to files 412, 414, and 416 of live data 210. Files 412, 414, and 416 may be live files that correspond to backed up files 422, 424, and 426 stored in backup 220. Indexing module 106 may copy content index 120, creating a backup content index 440. Backup content index 440 may contain index information 442, 444, and 446, corresponding to index information 432, 434, and 436, respectively. Indexing module 106 may then modify index information 442, 444, and 446 to reflect the respective locations of files 422, 424, and 426 instead of files 412, 414, and 416.

While indexing module 106 may index the content of the set of files in the backup in the manner described above in the context mentioned above, indexing module 106 may also perform in this manner in any suitable context.

In another context, indexing module 106 may index the content of the set of files in the backup when the content index of the live data includes data that is not a part of the backup. Such a case may arise when a content indexing system (such as an enterprise search appliance) has indexed several servers, but the backup is performed on a single server. Additionally or alternatively, such a case may arise when the backup is an incremental backup.

In the above described context, indexing module 106 may identify a backup content index (e.g., a content index that indexes the content of one or more previous backups). For example, indexing module 106 may identify a backup content index by identifying an existing backup content index or by creating a new backup content index. Indexing module 106 may then add the index information from the content index of the live data to the backup content index. In the case of an incremental backup, indexing module 106 may simply merge the index information for the incremental backup into the content index of the full backup without creating a new content index for the backup.

In an additional context, indexing module 106 may index the content of the set of files in the backup by using the content index of the live data as the content index for the backup as well. For example, indexing module 106 may index the content of the set of files in the backup by creating, for each file in the set of files indexed by the content index, a duplicate entry in the content index for a corresponding file in the set of files in the backup.

In another example, indexing module 106 may index the content of the set of files in the backup by adding to an index entry, for each file in the set of files indexed by the content index, a location of a corresponding file in the set of files in the backup. In this manner, one or more entries in the content index may point both to the live instance of the file and the backed up instance(s) of the file.

As an illustration of the scenario described above, and by way of example only, FIG. 5 shows a system 500 having a content index 120 with index information 532, 534, and 536, which may correspond to a file 512, a file 514, and a file 516 of live data 210. Files 512, 514, and 516 may be backed up as a file 522, 524, and 526 in backup 220. Indexing module 106 may index the content of files 522, 524, and 526 by adding the location of files 522, 524, and 526 to index information 532, 534, and 536, respectively, so that index information 532, 534, and 536 point to both the live instance of their respective files and the backup instance of their respective files.

Indexing module 106 may modify the content index to reflect the location of the backup instance of the file in any suitable manner. For example, the content index may index each entry using an ID number or string. Indexing module 106 may add the location of the backup instance of the file to the content index by associating the location of the backup instance of the file with the same ID as the corresponding live data file. In some cases, indexing module 106 may retrieve the location of the backup instance of the file from a backup system. For example, indexing module 106 may receive information from the backup system identifying a backup that contains the backup instance of the file (e.g., indexing module 106 may receive a name of an image containing the backup version of the file, an identification of a media server on which the backup version of the file is stored, an ID of a tape containing the backup version of the file, etc.).

By using the content index of the live data as the content index for the backup as well, systems and methods described herein may provide additional savings of computing resources such as I/O and processing. Using the same content index for both live data and the backup may also save storage space by not creating a duplicate index and may simplify the system by requiring only one content indexing system.

According to some embodiments, one or more of the systems described herein may stop the content index from updating until after indexing the content of the set of files in the backup. This may help to ensure that the state of the content index matches the state of the backup so that the indexing information in the content index reflects the state of the files in the backup (which might not otherwise be the case if the file changes after being backed up and before the content index is updated with the backup information). For example, one or more of the systems described herein may stop the content index from updating index information for a file past the point in time at which the file was backed up, so that the index information in the content index is not more recent than, and therefore out of sync with, the backed up version of the file.

Identification module 104 may notify the content index (e.g., content index 120) about a new location (e.g., in backup 220) of a particular file or may request index information from the content index for the file. The content index may determine that the index information it contains for the file is out-of-date (e.g., by matching the file name and original location for the backup file, but determining that other metadata such as the file size, modification date and/or fingerprint doesn't match). Alternatively, the content index may determine that it is configured to index the file but has not yet done so. Identification module 104 may then update the content index to include index information for the backup instance of the file (e.g., an instance of the file captured in backup 220). Identification module 104 may update the content index by various means. For example, identification module may re-index the live instance of the file, if the live instance is the same as the backup instance according to its metadata. In another example, identification module 104 may index the file as it exists in a snapshot that may have been created to facilitate creation of the backup. The snapshot instance of the file may be identical to the instance captured in the backup. In either of the previous two examples, identification module 104 may update the content index before or after the creation of the actual backup. In another example, identification module 104 may update the content index by indexing the backup instance of the file.

Figure 6:
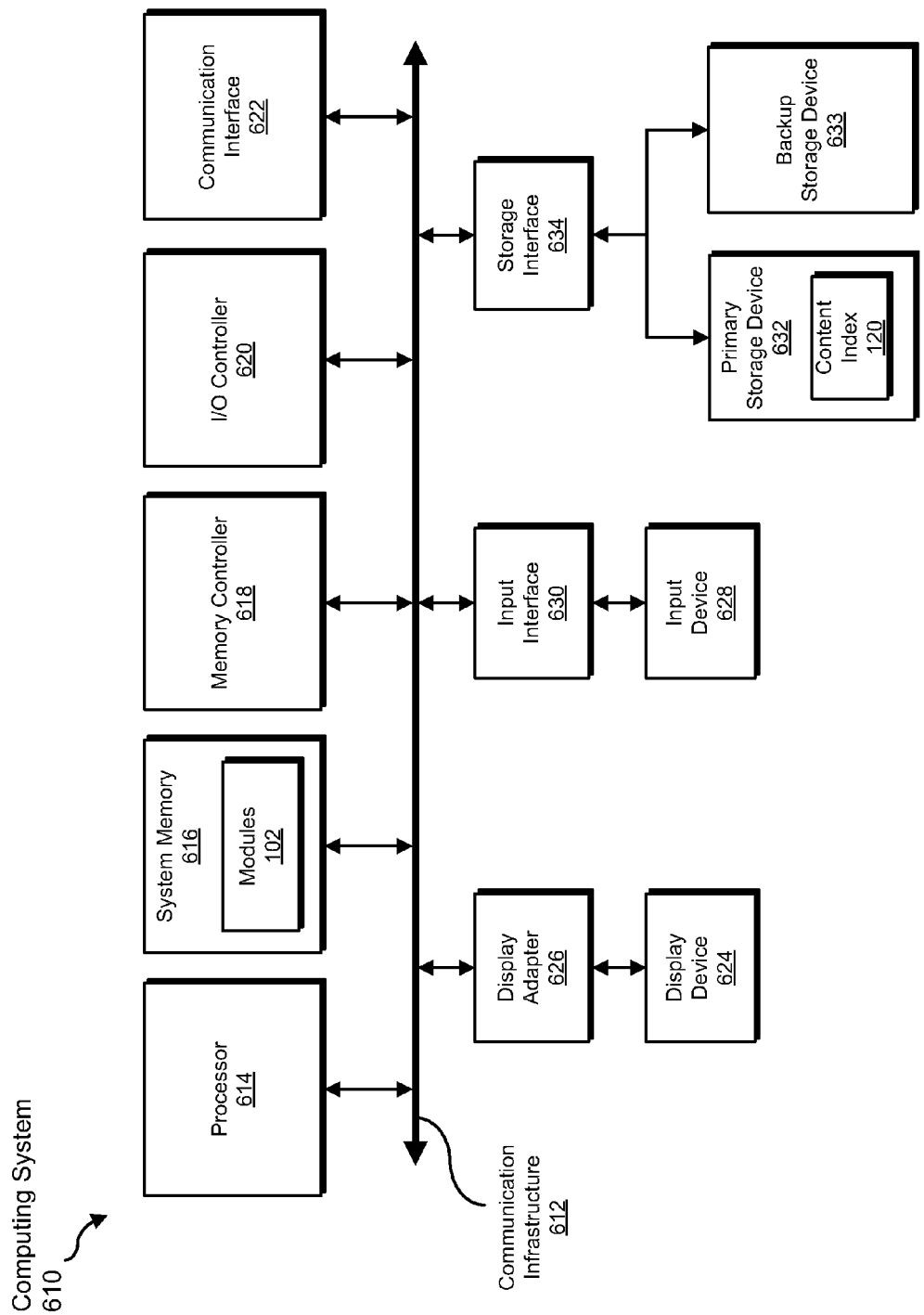
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, creating, including, updating, comparing, determining, merging, copying, modifying, indexing, adding, and/or stopping steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, creating, including, updating, comparing, determining, merging, copying, modifying, indexing, adding, and/or stopping.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, creating, including, updating, comparing, determining, merging, copying, modifying, indexing, adding, and/or stopping steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, creating, including, updating, comparing, determining, merging, copying, modifying, indexing, adding, and/or stopping steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, creating, including, updating, comparing, determining, merging, copying, modifying, indexing, adding, and/or stopping steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610. In one example, content index 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, creating, including, updating, comparing, determining, merging, copying, modifying, indexing, adding, and/or stopping steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
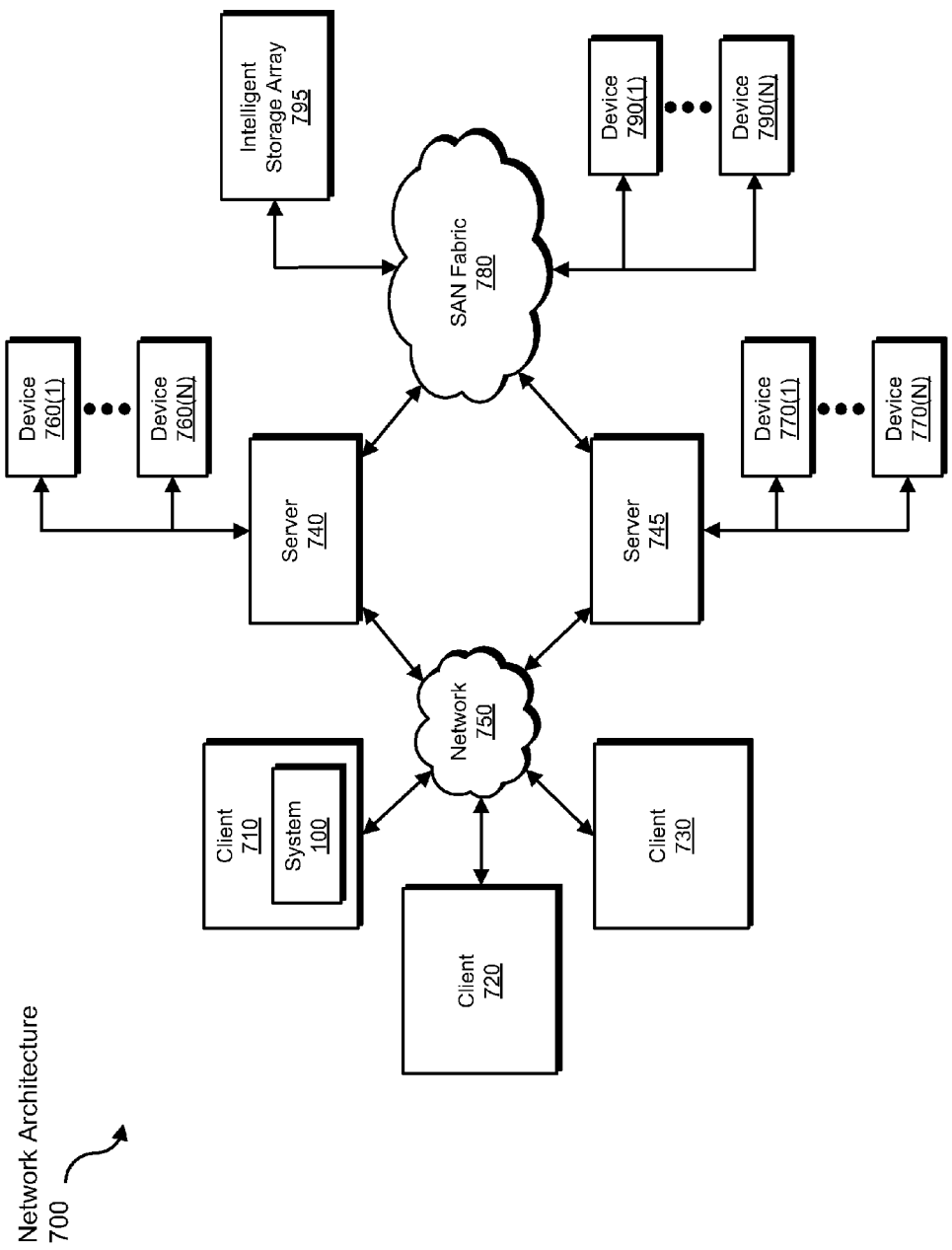
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750. Accordingly, network architecture 700 may perform and/or be a means for performing, either alone or in combination with other elements, one or more of the identifying, creating, including, updating, comparing, determining, merging, copying, modifying, indexing, adding, and/or stopping steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for indexing backup content.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a live data content index into a backup content index. As another example, one or more of the modules described herein may transform a computing system into an efficient system for indexing backup content.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for indexing backup content, at least a portion of the method being performed by a computing device comprising at least one processor, the method comprising:
   indexing a backup copy of live data by using an existing content index that covers the live data by:
      identifying the backup copy of the live data;
         identifying the existing content index that indexes at least a part of the live data, the live data comprising a primary copy of data that is currently in use;
         identifying a set of files in the backup copy that correspond to a set of files indexed by the existing content index;
         indexing content of the set of files in the backup copy based on index information of the set of files indexed by the existing content index by adding to an index entry in the existing content index, for each file in the set of files, a location of a corresponding file in the backup copy such that each entry in the existing content index points to both live and backup instances of datad.

2. The computer-implemented method of claim 1, wherein identifying the backup copy of live data comprises creating a snapshot from which to create a backup.

3. The computer-implemented method of claim 2, wherein creating the snapshot from which to create the backup comprises including the existing content index in the snapshot.

4. The computer-implemented method of claim 2, wherein identifying the existing content index comprises updating the existing content index to reflect changes to the live data included in the snapshot.

5. The computer-implemented method of claim 1, wherein indexing the content of the set of files in the backup copy comprises:
   copying the existing content index and modifying the copy of the existing content index to refer to the backup location of each file in the set of files indexed by the existing content index.

6. The computer-implemented method of claim 1, wherein adding to the existing content index, for each file in the set of files in the backup copy, the reference to the file comprises:
   creating, for each file in the set of files indexed by the existing content index, a duplicate entry in the existing content index for a corresponding file in the set of files in the backup copy.

7. The computer-implemented method of claim 1, wherein adding to the existing content index, for each file in the set of files in the backup copy, the reference to the file comprises:
   for each file in the set of files indexed by the existing content index and included in the backup copy, adding a reference of a corresponding backed-up file to an existing index entry of the existing content index.

8. The computer-implemented method of claim 1, wherein identifying the set of files in the backup copy that correspond to the set of files indexed by the existing content index comprises:
   identifying metadata for at least one file in the backup copy;
   comparing the metadata with metadata in the existing content index;
   determining, based on the metadata, that the file in the backup copy is equivalent to a file in the existing content index.

9. The computer-implemented method of claim 8, wherein the metadata comprises at least one of:
   a file name;
   an original location for the file;
   a file size;
   a creation time;
   a last modification time;
   a fingerprint.

10. The computer-implemented method of claim 1, further comprising stopping the existing content index from updating until after indexing the content of the set of files in the backup copy.

11. A system for indexing a backup copy of live data by using an existing content index that covers the live data, the system comprising:
   an identification module programmed to:
      identify the backup copy of the live data;
         identify the existing content index that indexes at least a part of the live data, the live data comprising a primary copy of data that is currently in use;
         identify a set of files in the backup copy that correspond to a set of files indexed by the existing content index;
   an indexing module programmed to:
      index content of the set of files in the backup copy based on index information of the set of files indexed by the existing content index by adding to an index entry in the existing content index, for each file in the set of files, a location of a corresponding file in the backup copy such that each entry in the existing content index points to both live and backup instances of data;
   at least one processor configured to execute the identification module and the indexing module.

12. The system of claim 11, wherein the indexing module is programmed to index the content of the set of files in the backup copy by adding to the existing content index, for each file in the set of files in the backup copy, a reference to the file.

13. The system of claim 12, wherein the indexing module is programmed to add to the existing content index, for each file in the set of files in the backup copy, the reference to the file by creating, for each file in the set of files indexed by the existing content index, a duplicate entry in the existing content index for a corresponding file in the set of files in the backup copy.

14. The system of claim 12, wherein the indexing module is programmed to add to the existing content index, for each file in the set of files in the backup copy, the reference to the file by adding to an index entry, for each file in the set of files indexed by the existing content index and included in the backup copy, a location of a corresponding file in the set of files in the backup copy.

15. The system of claim 11, wherein the identification module is programmed to identify the set of files in the backup copy that correspond to the set of files indexed by the existing content index by:
  identifying metadata for at least one file in the backup copy;
  comparing the metadata with metadata in the existing content index;
  determining, based on the metadata, that the file in the backup copy is equivalent to a file in the existing content index.

16. A non-transitory computer-readable-storage medium comprising one or more computer-executable instructions that, when executed by at least one processor of a computing device, cause the computing device to:
  index a backup copy of live data by using an existing content index that covers the live data by:
    identifying the backup copy of the live data;
    identifying the existing content index that indexes at least a part of the live data, the live data comprising a primary copy of data that is currently in use;
    identifying a set of files in the backup copy that correspond to a set of files indexed by the existing content index;
    index content of the set of files in the backup copy based on index information of the set of files indexed by the existing content index by adding to an index entry in the existing content index, for each file in the set of files, a location of a corresponding file in the backup copy such that each entry in the existing content index points to both live and backup instances of data.

17. The non-transitory computer-readable medium of claim 16, wherein the one or more computer-executable instructions cause the computing device to identify the backup copy of live data by causing the computing device to create a snapshot from which to create a backup.

18. The non-transitory computer-readable medium of claim 17, wherein the one or more computer-executable instructions cause the computing device to create the snapshot from which to create the backup by causing the computing device to include the existing content index in the snapshot.

19. The non-transitory computer-readable medium of claim 17, wherein the one or more computer-executable instructions cause the computing device to identify the existing content index by causing the computing device to update the existing content index to reflect changes to the live data included in the snapshot.

20. The non-transitory computer-readable medium of claim 16, wherein the one or more computer-executable instructions cause the computing device to index the content of the set of files in the backup copy by causing the computing device to copy the existing content index and modify the copy of the existing content index to refer to the backup location of each file in the set of files indexed by the existing content index.

* * * * *

UNITED STATES PATENT AND TRADEMARK OFFICE
CERTIFICATE OF CORRECTION

| | | |
|---|---|---|
| PATENT NO. | : 8,793,222 B1 | Page 1 of 1 |
| APPLICATION NO. | : 12/614012 | |
| DATED | : July 29, 2014 | |
| INVENTOR(S) | : Russell Stringham | |

It is certified that error appears in the above-identified patent and that said Letters Patent is hereby corrected as shown below:

In The Claims

Claim 1, at column 15, lines 49 to 56, should read:

indexing content of the set of files in the backup copy based on index information of the set of files indexed by the existing content index by adding to an index entry in the existing content index, for each file in the set of files, a location of a corresponding file in the backup copy such that each entry in the existing content index points to both live and backup instances of data.

Signed and Sealed this
Thirteenth Day of January, 2015

Michelle K. Lee
*Deputy Director of the United States Patent and Trademark Office*